(12) United States Patent
Orbay

(10) Patent No.: US 11,525,423 B2
(45) Date of Patent: Dec. 13, 2022

(54) CLEANING SYSTEM FOR A VEHICLE COMPONENT

(71) Applicant: Volvo Car Corporation, Gothenburg (SE)

(72) Inventor: Raik Orbay, Hönö (SE)

(73) Assignee: Volvo Car Corporation, Gothenburg (SE)

( * ) Notice: Subject to any disclaimer, the term of this patent is extended or adjusted under 35 U.S.C. 154(b) by 489 days.

(21) Appl. No.: 16/676,497

(22) Filed: Nov. 7, 2019

(65) Prior Publication Data

US 2020/0149469 A1 May 14, 2020

(30) Foreign Application Priority Data

Nov. 8, 2018 (EP) ..................................... 18205084

(51) Int. Cl.
*F02M 26/50* (2016.01)
*B08B 7/02* (2006.01)
*F01P 11/06* (2006.01)

(52) U.S. Cl.
CPC .............. *F02M 26/50* (2016.02); *B08B 7/028* (2013.01); *F01P 11/06* (2013.01); *F01N 2290/08* (2013.01); *F01P 2011/063* (2013.01)

(58) Field of Classification Search
CPC ........ F02M 26/50; F02M 26/22; B08B 7/028; F01P 11/06; F01P 2011/063; F01N 2290/08; F01N 2240/00; F01N 2240/02; F01N 2240/05; F01N 2240/06; F01N 2260/04; F01N 2290/02; F01N 2290/06;

(Continued)

(56) References Cited

U.S. PATENT DOCUMENTS

2001/0010029 A1* 7/2001 Hattori .................. B60W 10/04
477/37
2009/0120471 A1* 5/2009 Ludwiczak ............... B60S 1/02
134/201

(Continued)

FOREIGN PATENT DOCUMENTS

CN 103154461 A 6/2013
CN 103867270 A 6/2014

(Continued)

OTHER PUBLICATIONS

Jan. 24, 2019 European Search Report issued on International Application No. 18205084.

(Continued)

*Primary Examiner* — Jacob M Amick
*Assistant Examiner* — Charles J Brauch
(74) *Attorney, Agent, or Firm* — Clements Bernard Walker; Christopher L. Bernard

(57) ABSTRACT

A cleaning system for removal of contaminants from a surface of a vehicle component exposed to a gas or fluid flow, the cleaning system comprising: an excitation device adapted to be attached to the vehicle component in the vicinity of the surface exposed to contaminants, wherein the excitation device is configured to cause the surface to mechanically vibrate by transferring a vibrational excitation to the surface; wherein the frequency of the vibrational excitation is controllable to be based on the configuration of the vehicle component as well as other modelled/measured parameters.

12 Claims, 9 Drawing Sheets

(58) Field of Classification Search
CPC .......... F01N 2450/40; F01N 2560/025; F01N 2560/06; F01N 2900/16; F01N 13/00; F01N 9/00; F01N 11/00; F02D 41/1493; F02D 41/22; Y02T 10/40; F02B 77/04; F02B 77/00; F02B 77/08; B60S 3/00; B60S 3/04
See application file for complete search history.

(56) References Cited

U.S. PATENT DOCUMENTS

2013/0305690 A1* 11/2013 Maus ................. F01N 13/1822
  60/274
2015/0267581 A1* 9/2015 Ware, Jr. .................. B08B 7/02
  15/345

FOREIGN PATENT DOCUMENTS

| CN | 104129277 A | 11/2014 | |
|---|---|---|---|
| CN | 107031333 A | 8/2017 | |
| DE | 102004029640 A1 * | 1/2006 | ......... B01D 46/0063 |
| DE | 102004029640 A1 | 1/2006 | |
| DE | 102010047275 A1 | 4/2012 | |
| WO | 9812422 A1 | 3/1998 | |
| WO | WO-9812422 A1 * | 3/1998 | ............... F01N 3/28 |

OTHER PUBLICATIONS

Office action and search report issued in the corresponding CN application No. 201911076315.3.

* cited by examiner

CLEANING SYSTEM FOR A VEHICLE COMPONENT

CROSS-REFERENCE TO RELATED APPLICATION

The present disclosure claims the benefit of priority of co-pending European Patent Application No. 18205084.9, filed on Nov. 8, 2018, and entitled "A CLEANING SYSTEM FOR A VEHICLE COMPONENT," the contents of which are incorporated in full by reference herein.

TECHNICAL FIELD

The present invention relates to a cleaning system for removal of contaminants from a surface of a vehicle component. The present invention further relates to a method for cleaning a surface of a vehicle component.

BACKGROUND

The emission control systems of vehicles most commonly comprise a catalyst unit (e.g. a selective catalytic reduction device, SCR-device) for reducing the levels of nitrogen oxides that are released into the surrounding air. Further, often is so-called exhaust recirculation devices used for recirculation the exhaust flow back into the engine cylinder in-flow for e.g. decreasing the oxygen content in the combustion process in the engine (and thereby the NOx-emissions), and cooling of the combustion gases.

In order to monitor the emission levels in the exhaust and the performance of the power train control systems, various types of sensors are arranged in the exhaust gas flow. For example, an oxygen sensor often referred to as a "lambda sensor" may be arranged to monitor the oxygen levels of the exhaust in order to continuously determine the fuel-air ratio in the fuel supplied to the engine, or a temperature sensor may be arranged to monitor the temperature of the exhaust gas. Generally, an internal combustion engine needs a specific air-fuel ratio to operate properly.

However, the sensors, as well as other parts (e.g. the exhaust recirculation devices) of the vehicle are exposed to contaminants from the exhaust gas or other gas flows. Such contaminants range from fuel, scrapped metal particulates, castings, silicone, glycol, etc. From some of the contaminants, soot deposit build up which may be caused by condensation of hydrocarbons, deposition of ash particles, compression of soot due to thermophoresis and pressure pulsations in the exhaust gas flow.

Contaminant deposits may cause spurious sensor readings, e.g. from the oxygen sensor or other sensors. Furthermore, particle deposits may cause clogging of heat exchangers, which may cause malfunctioning issues on the heat exchanger itself, as well as on components affected by the operation of the heat exchanger.

A common way to remove the soot deposits from various components in the exhaust system is to heat the components in order to burn off the soot, as is described in US2014/0047912.

However, heating of components may not be possible for all types of surfaces and materials these components comprise. Some components may be damaged if the heating is too excessive.

Accordingly, there is a need for improved ways for contamination deposit removal in vehicle systems.

SUMMARY

In view of the above, it is an object of the present invention to provide an improved cleaning system for removal of contaminants from surfaces of a vehicle component.

According to a first aspect of the invention, there is provided a cleaning system for removal of contaminants from a surface of a vehicle component exposed to a gas or fluid flow, the cleaning system comprises: an excitation device adapted to be attached to the vehicle component in the vicinity of the surface exposed to contaminants, wherein the excitation device is configured to cause the surface to mechanically vibrate by transferring a vibrational excitation to the surface; wherein the frequency of the vibrational excitation is controllable to be based on the configuration of the vehicle component.

The present invention is based on the realization that the adhesion forces between deposited material and a surface, in particular a metal surface, is relatively weak. Accordingly, causing the surface to vibrate enables to shake-off the deposit particles from the surface. Accordingly, no or only some heating of the surface is needed.

Advantages of the inventive concept include improved deposit removal and reduced risk of overheating the contaminated vehicle component.

The surface of the component is a clogging- or contamination-susceptible surface, which is exposed to contaminants during normal operation of the vehicle component.

According to some embodiments, the system may comprise a control unit configured to control the frequency of the vibrational excitation, wherein the frequency is based on the configuration of the vehicle component. The control unit thus controls the operation speed of the electric motor for the rotation unbalance device, or the voltage modulation of the power source, or the operation of the ultrasound generator.

In embodiments, the frequency of the vibrational excitation may be swept through a frequency range comprising the natural frequency of the vehicle component. The natural frequency is the frequency at which the component would vibrate without additional excitation force. Excitation of the component at its natural frequency advantageously causes mechanical vibration with greater amplitude than if the excitation frequency is off the natural frequency. Thereby, improved deposit removal is assured. Furthermore, the frequency range may also include the natural frequencies of sub-components of the vehicle component in order to efficiently clean also the sub-components.

According to embodiments, the excitation device is a rotating unbalance device. A rotating unbalance device is a versatile device which may be used for generating a mechanical vibration. Furthermore, a rotating unbalance device may be arranged away from the contaminated surface of interest as long as the mechanical vibration may be transferred to the contaminated surface, thereby providing for several possible arrangement solutions. For example, the excitation device may be adapted to be arranged in a location not exposed to the gas flow e.g. the exhaust gas flow in a vehicle emission control system. Thus, the excitation device may advantageously be arranged isolated from the contaminated gas or fluid flow.

In embodiments, the rotating unbalance device may comprise an electric motor, wherein the electric motor is configured to cause a rotation member to rotate about an axis of rotation, wherein the axis of rotation is off-center from the center of mass of the rotation member. This is one advantageous solution for a rotating unbalance device which has low power consumption and is cost efficient. A control unit may control the operation of the electric motor.

Another possible implementation for generating the mechanical vibration may be provided by an excitation device comprising an ultra-sound generator. The ultra-sound generator may thus cause vibrations by emitting an ultrasound signal towards the vehicle component. Ultrasound is generally in the frequency range from 15 kHz to 10 GHz. A frequency close or at the natural frequency of the vehicle component may advantageously be selected.

Furthermore, an excitation device may comprise a piezoelectric component or a vibrational solenoid and a power source configured to provide an excitation voltage signal to the piezoelectric component or the vibrational solenoid to cause the piezoelectric component or the vibrational solenoid to vibrate. A piezoelectric device is configured to provide a mechanical deflection when exposed to a voltage signal. Accordingly, a piezoelectric component may be caused to vibrate at a frequency based on the frequency of the applied voltage signal.

Moreover, the excitation device may comprise a linear resonant actuator. A linear resonant actuator generally comprises a linear actuator motor driven by an AC-voltage to cause an oscillating motion of an inertial mass.

The inventive concept is applicable to various types of vehicle components which may themselves comprise the surface exposed to contaminants. The surface exposed to contaminants may, for example, be comprised in one of a lambda probe, or a temperature probe, or a heat exchanger, or an exhaust gas recirculation system component, or a gas exchange system component.

In embodiments, the excitation device is an add-on device adapted to be retrofitted on pre-mounted vehicle components of the vehicle. Accordingly, the inventive concept may advantageously provide for minimal adjustment of existing vehicle systems for implementing the improved cleaning system. Thus, it advantageously provides for mounting of the add-on excitation device to pre-mounted vehicle components already in use.

The vehicle and/or its emission abatement system may be designed initially and so manufactured as to include the excitation device and its control algorithm as a component of the vehicle.

According to one embodiment, the excitation device may be comprised of an active damper for mechanically damping power train vibrations of the vehicle. The active damper is positioned in the vehicle sub-frame below the power train and is configured to counteract unpleasant vibrational harmonics. The active damper may advantageously serve as an excitation device by affecting it to provide an additional modulation at frequencies in a frequency range near to the clogging susceptible vehicle components' natural frequency. The excitation may be provided at chosen intervals not to disturb the passengers of the vehicle or interrupt any other functions of the vehicle.

According to some embodiments, the control unit may be configured to: receive an event signal indicative of internal or external vehicle events, and trigger excitation device to provide the vibrational excitation in response to receiving the event signal. Thereby, the triggering of the excitation may advantageously be provided at suitable times to avoid obstructing other functions or disturbing passengers of the vehicle.

Accordingly, the excitation may be triggered by certain events, so that the vehicle driver/passengers will never notice inharmonious behavior. Such events include, whenever door closing, wide open throttle, crank-up, etc.

According to some embodiments, the control unit may be configured to detect that the vehicle component is contaminated, wherein the control unit is configured to cause the excitation device to provide the vibrational excitation until a pre-determined cleansing level is reached.

Detecting that the vehicle component is contaminated may be based on a decision algorithm run by the control unit. The decision algorithm makes use of experimental and/or computational testing conducted previously to quantify amount of excitation device action needed to attain certain cleaning levels for the contaminant deposited on the vehicle component at hand.

Detection of the contamination levels may be performed by measuring direct, indirect, or modelled parameters for quantifying contaminant deposition levels. The parameters may be influenced by driver behavior and may, for example, comprise at least one of the following: vehicle speed, engine speed, power and torque demand, geographical region, ambient temp and humidity, fuel quality, (octane/cetane numbers etc.) engine off periods per day/month/year, number of cold starts, number of hot starts, engine age, elapsed time after last cleaning event, etc.

For example, the decision algorithm may be based on a mathematical model which counts engine operation hours, elapsed time after prior cleaning, ambient temperature, which may be compared to a pre-set temp etc., to be able to correlate a function of contaminant deposition to the measured quantities. The function may also empirically determined e.g. in a laboratory.

Another possible implementation is that the algorithm may be based on measurements from an experimental setup, which is conducted specifically for the certain type of engine in certain type of conditions prior to microprocessor programming. For example, the contaminant deposition height in microns is logged as a lookup table which the microprocessor connected to the excitation device will use.

Another possible implementation is to excite the vibrations every pre-determined number of hours (e.g. 3000 hours). The pre-determined number of hours may be based on knowledge of the amount of deposition detected whenever the vehicle is serviced. In this way, one can determine an approximate number of pre-determined number of hours to simplify the algorithm and decrease costs.

Another possible implementation is to devise a sensing device which measures, for instance, electrical resistance through the sensor casing of the emission control component. One may, for example, assume that if there is soot, there is higher electrical resistance. It may also be possible to detect the sensor temperature and relate the temperature to the presence of contaminants, e.g. in the presence of soot, sensor temperature is higher than the usual temperature threshold which is reached when the engine is at its working temperature region.

Another example is to analyze the presence of contaminants based on reflected light. In other words, one can send an IR/UV/VR light, and if the light is reflected, it may be concluded that there is no contaminant present. If the light is dispersed, it may be assumed that contaminant is present. The frequency of the vibrational excitation may further be based on other modelled/measured parameters related to e.g. aging of the vehicle component, or shift in center of mass of the vehicle component, and the mass itself.

According to a second aspect of the invention, there is provided a method for cleaning a surface of a vehicle component using an excitation device configured to cause the surface to mechanically vibrate by transferring a vibrational excitation to the surface, the method comprising:

receiving an event signal indicative of internal or external vehicle events, and triggering the excitation device to provide the vibrational excitation at a frequency based on the configuration of the vehicle component in response to receiving the event signal.

According to one embodiment, the method may include determining at least one cleaning evaluation parameter; based on the cleaning evaluation parameter, determining whether or not cleaning of the vehicle component is required, when it is determined that the vehicle component is in need of cleaning, trigger the excitation device to provide the vibrational excitation.

A cleaning evaluation parameter may relate to e.g. engine operation hours, elapsed time after prior cleaning, ambient temperature, which may be compared to a pre-set temp etc., to be able to correlate a function of contaminant deposition to the measured quantities.

A further possible cleaning evaluation parameter may be a parameter which can be related to contaminant deposition height in e.g. microns, which can be logged as a look-up table. The measured parameter may be used to determine from the look-up table the actual height and extent of contamination such as the extent of spreading of the contamination on the vehicle component, and thus estimate the need of cleaning and its vigor i.e. efficiency.

Further possible cleaning evaluation parameters may be electrical resistance through the sensor casing or the sensor temperature, in the case of the vehicle component being a sensor. This is described above.

Effects and features of the second aspect of the invention are largely analogous to those described above in connection with the first aspect of the invention.

A computer program product comprising a computer readable medium having stored thereon computer program means for controlling an excitation device to mechanically vibrate for transferring a vibrational excitation to the surface of e vehicle component, wherein the computer program product comprises: code for evaluating a received event signal indicative of internal or external vehicle events; and code for triggering the excitation device to provide the vibrational excitation at a frequency based on the configuration of the vehicle component in response to receiving the event signal.

A computer program product comprising a computer readable medium having stored thereon computer program means for controlling an excitation device to mechanically vibrate for transferring a vibrational excitation to the surface of e vehicle component, wherein the computer program product comprises: code for determining at least one cleaning evaluation parameter; code for, based on the cleaning evaluation parameter, determining whether or not cleaning of the vehicle component is required, code for, when it is determined that the vehicle component is in need of cleaning, trigger the excitation device to provide the vibrational excitation.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

Figure 1:
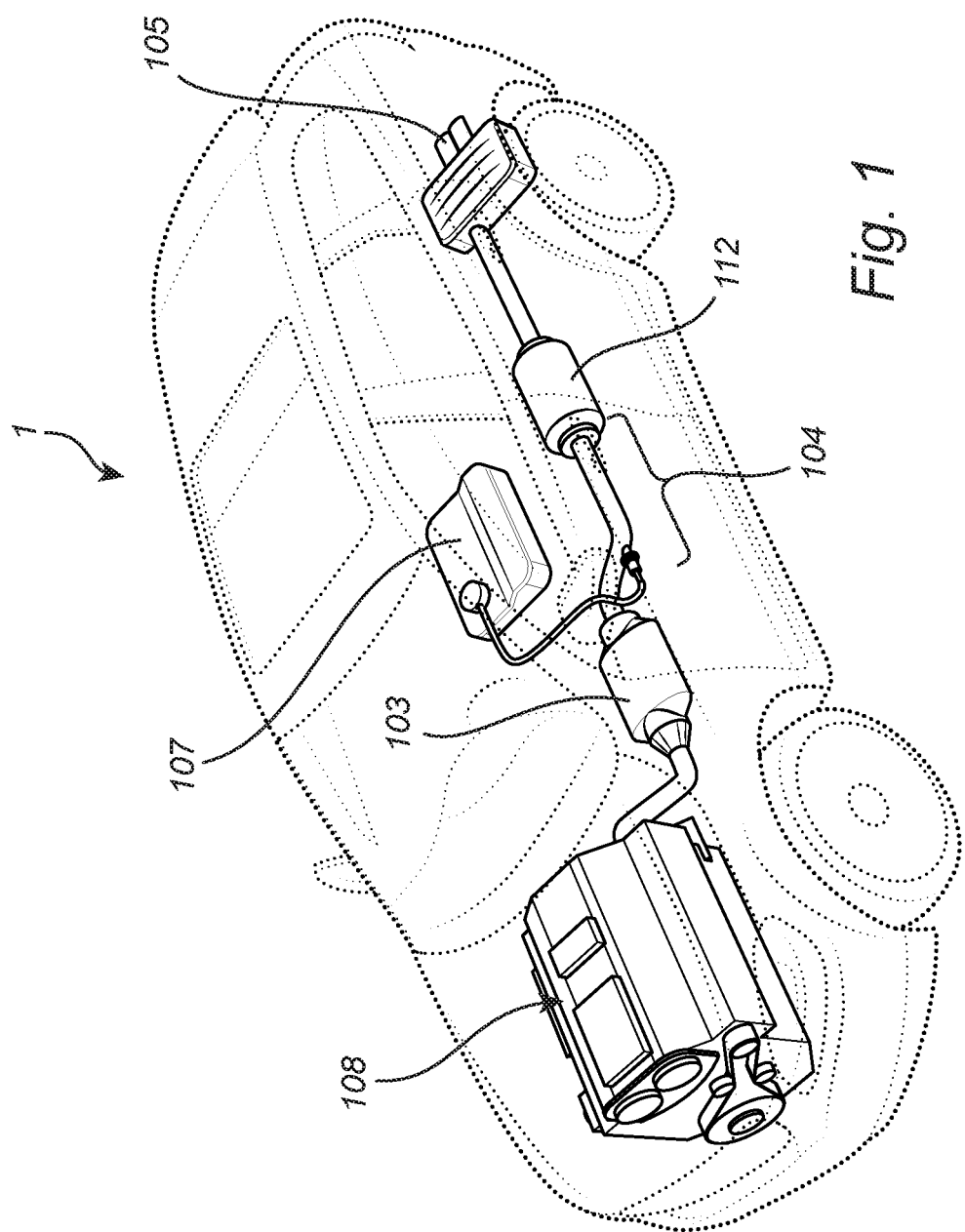
FIG. 1 conceptually illustrates application of embodiments of the invention.

In the present detailed description, various embodiments of the cleaning system according to the present invention are mainly described with reference to sensors in an aftertreatment system or in exhaust recirculation devices. However, the present invention is equally well applicable to other vehicle components such as components of heat exchangers and mixture preparation systems of vehicles.

A vehicle in accordance with the present inventive concept include any type of vehicle such as e.g. cars, busses, trucks, boats, ships, trains, covered as any ground-, sea-, or air-vehicles, etc. Thus, this invention may generally be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 conceptually illustrates a vehicle in the form of a car 1. The car 1 comprises a combustion engine, such as a diesel engine 108, which produces exhaust effluents. The car further comprises an exhaust aftertreatment system for reducing the emissions of e.g. nitrogen oxides, from the combustion, primarily emitted via the tail pipe 105. The aftertreatment system comprises a mixing section 104, which receives exhaust gas from the engine 108, and a selective catalytic reduction device 112 (SCR-device) arranged downstream of the mixing section 104. Optionally, a particulate filter 103 is arranged between the mixing section 104 and the engine 108.

There is further a tank 107 serving as a reservoir of a liquid reductant provided to the mixing section 104. The liquid reductant is often a urea solution provided to the exhaust gas in controlled amounts for increasing the efficiency of the SCR-device. However, dosing at low temperatures leads to inability to evaporate the liquid reductant and thereby to an increased risk of deposit build-up on vehicle components arranged in the exhaust gas flow.

Figure 2:
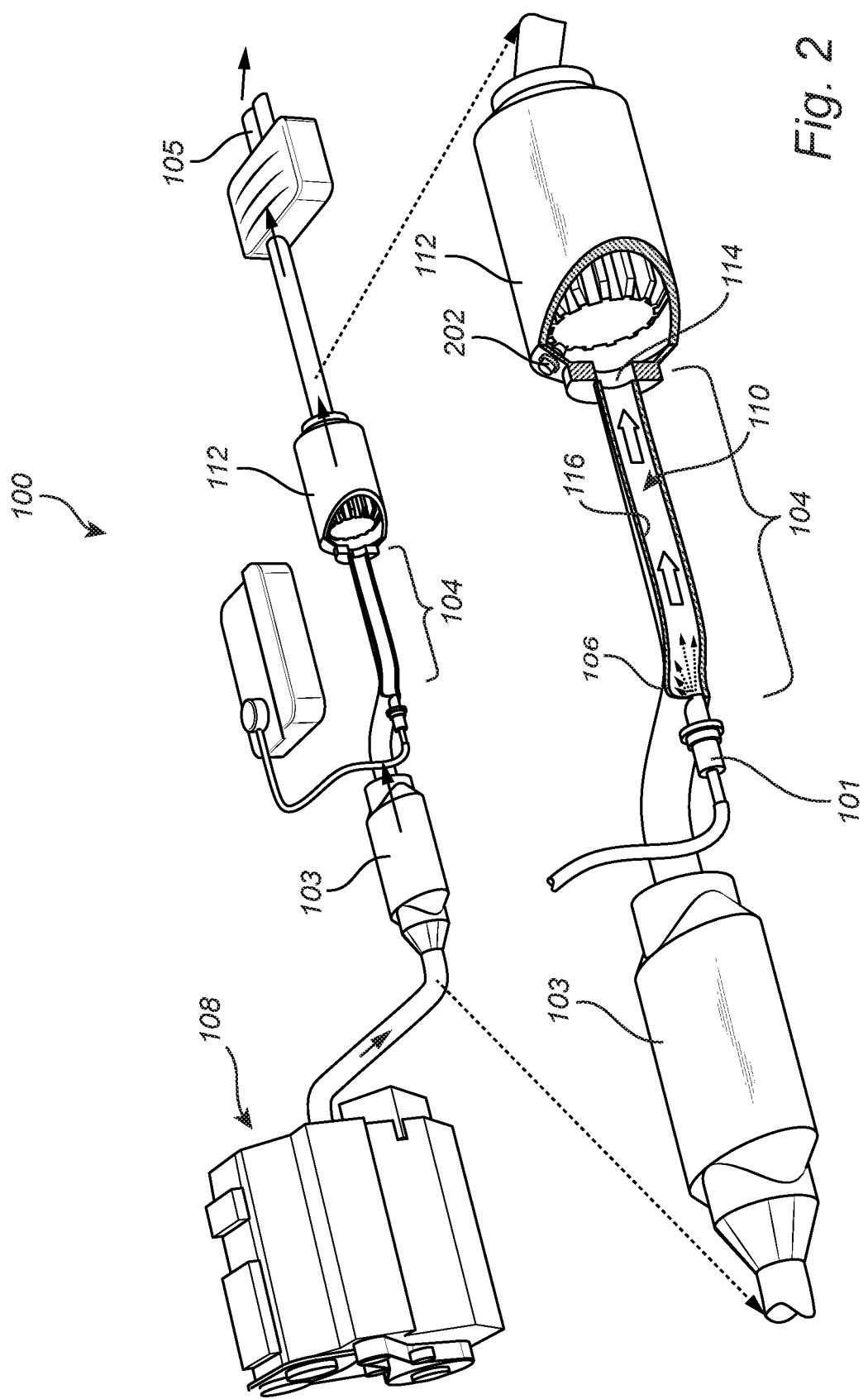
FIG. 2 schematically illustrates an exhaust aftertreatment system where a cleaning system may be implemented according to exemplary embodiments.

FIG. 2 schematically illustrates an exhaust aftertreatment system 100 in which embodiments of the cleaning system may be arranged. As described with reference to FIG. 1, an engine 108 produces exhaust gases which is received by a mixing section 104 of the aftertreatment system 100 through an inlet 106. Optionally, a particulate filter 103 is arranged between the mixing section 104 and the engine 108.

The system 100 further comprises an injection unit 101 for providing a liquid reductant to a mixing compartment 110 of the mixing section 104.

Furthermore, a sensor in the form of an oxygen sensor 202 is arranged in the exhaust gas flow up-stream of the catalytic converter, i.e. the SCR-device 112. Such oxygen sensor 202 is often called a lambda probe and is configured to measure the proportion of oxygen in the exhaust gas flow. With the measured oxygen levels, it is possible for a vehicle control unit to determine the amount of fuel required for complete combustion in the engine. The lambda probe may however be contaminated by soot in the exhaust gas, which may affect its performance. Therefore a cleaning system (not shown, see FIG. 3), in accordance with embodiments of the invention, is arranged for removal of contaminants from a surface of the vehicle component 202, here in the form of a lambda probe 202. This will next be described in more detail with reference to FIG. 3.

Figure 3:
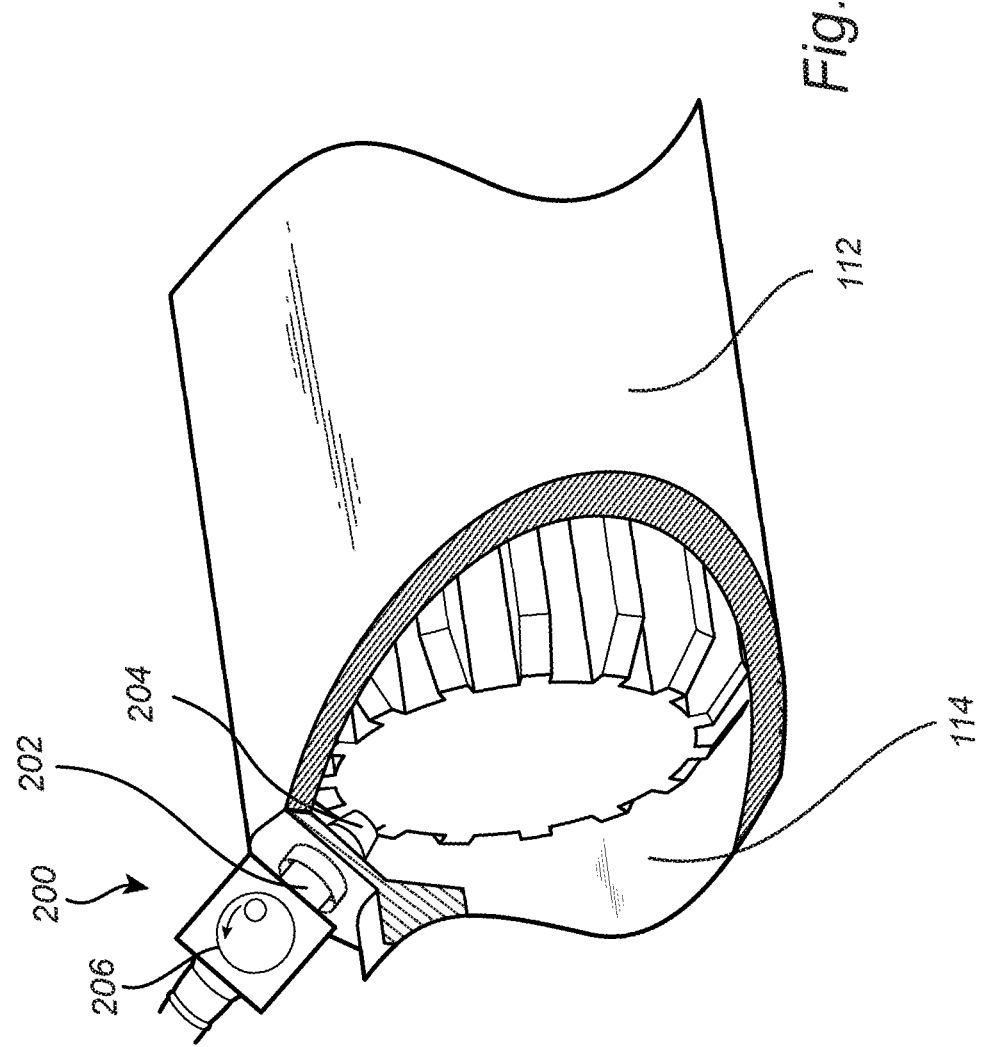
FIG. 3 schematically illustrates an excitation device attached to a lambda probe.

FIG. 3 schematically illustrates a perspective cross-section part of the SCR-device 112 and the inlet 114 shown in FIG. 2. Furthermore, FIG. 3 shows the vehicle component in the form of the lambda probe 202 shown in FIG. 2 arranged up-stream of the SCR-device 112.

The sensor surface 204 of the lambda probe 202 is exposed to the contaminated exhaust effluent flow and is thus susceptible to soot deposits. A cleaning system 200 comprising an excitation device 206 is attached to the lambda probe 202 outside of the gas flow. Thus, the excitation device 206 is not exposed to the internal gas flow in the exhaust aftertreatment system.

The excitation device 206 is configured to cause the contaminated surface 204 to mechanically vibrate. For this, the excitation device 206 is adapted to transfer a vibrational excitation to the surface 204. The excitation device 206 is mechanically fixated to the lambda probe 202 such that the excitation device 206 may transfer a mechanical vibration via the body of the lambda probe 202 to the surface 204.

The excitation device 206 is communicatively connected to a control unit (not shown), which controls the frequency of the vibration via electrical command signals. The frequency of the excitation is selected based on the configuration of the vehicle component. In this example case, the frequency of the excitation is selected based on the configuration of the lambda probe 202. Preferably, the frequency of the vibrational excitation comprises the natural frequency of the casing of the lambda probe 202. The control unit may be a comprised in the cleaning system 200, alternatively the control unit may be a vehicle control unit, e.g. an ECU of the vehicle connected to the excitation device 206. When the control unit is comprised in the cleaning system 200 it advantageously functions as a stand-alone device. In such case, the control unit may be arranged in the same housing as the excitation device.

Furthermore, the excitation device 206 is only conceptually shown in FIG. 3, and the dimensions and appearance may thus differ from the conceptual illustration. For example, the excitation device 206 may be enclosed in a housing.

In FIG. 3 the cleansing system is exemplified as cleaning a lambda probe. However, various other vehicle components may be cleaned using a cleaning system in accordance with embodiments of the invention. Some examples include: components of exhaust gas recirculation systems such as valves and cooler surfaces, oil separator components, oil cooler components, turbo system components, other sensor surfaces, cylinder head components, etc.

Figure 4:
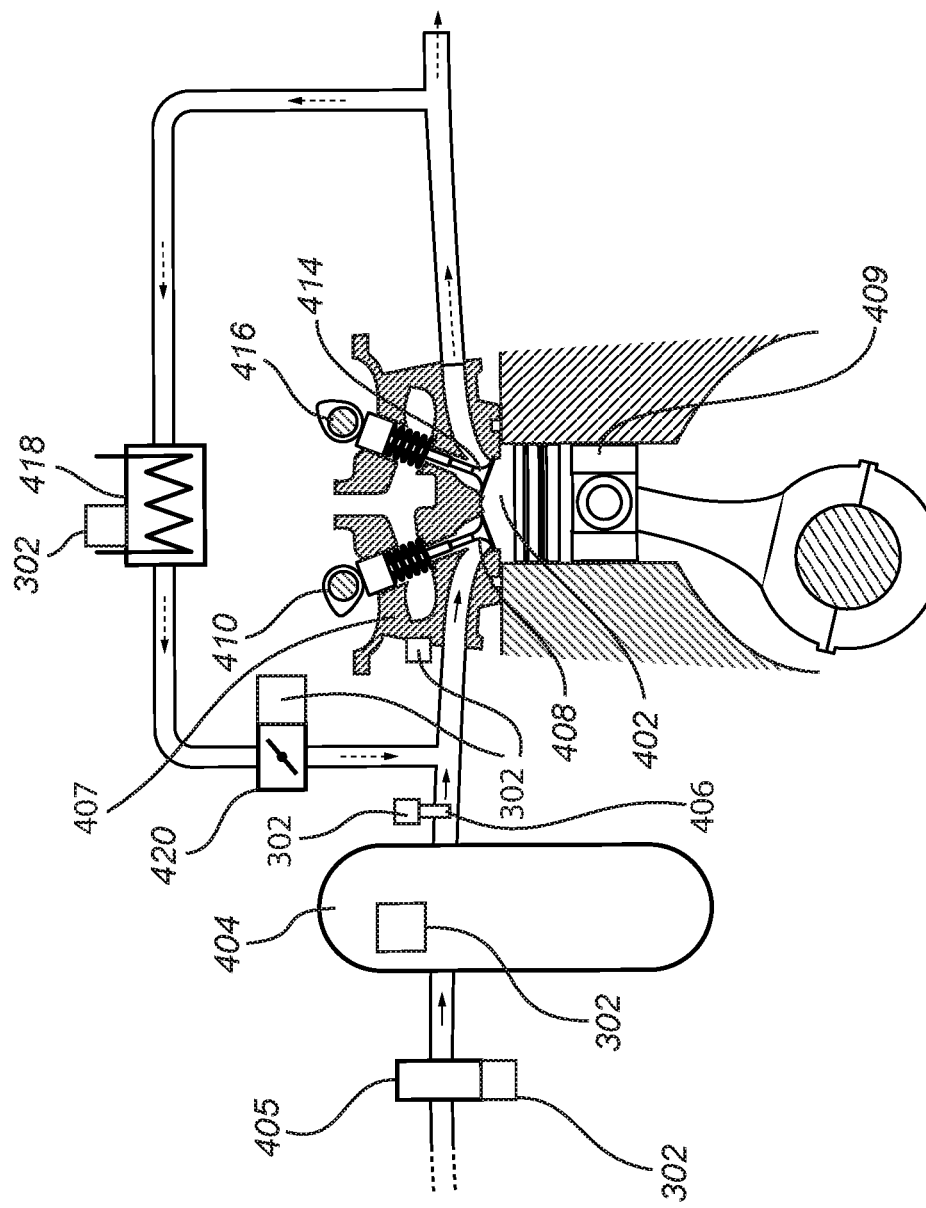
FIG. 4 conceptually illustrates an air intake and exhaust outlet system of a combustion engine, where cleaning system elements may be implemented according to exemplary embodiments.

Accordingly, a cleaning system according to embodiments of the invention may be arranged to remove contaminants from various vehicle components. FIG. 4 exemplifies some example vehicle components.

FIG. 4 conceptually illustrates an air intake and exhaust outlet system of a combustion engine and exemplary locations for an excitation device 302 according to some possible implementations for embodiments.

In detail, FIG. 4 schematically illustrates an intake air cooler 404 adapted to receive air from the outside environment and an air intake gas flow regulator 405 configured to regulate the gas flow into the intake air cooler 404 and to measure the gas flow into the intake air cooler 404.

Further, a temperature sensor 406 is arranged in the air flow to measure the temperature of the air downstream of the air cooler 404. This may be advantageous for ensuring that too high temperature fluctuations in the intake do not occur. Such temperature sensors 406, air coolers 404, and regulators 405 are susceptible to particle deposits and may thus be in need of cleaning. Thus, an excitation device 302 may advantageously be used for cleaning these vehicle components.

A cylinder head 407 is arranged to seal a cylinder volume 402, where the piston 409 operates during combustion of the fuel. Air mixed with recirculated exhaust gas is allowed into the cylinder volume 402 via an air intake control valve 408 arranged in the cylinder head 407. A cam 410 of a camshaft is adapted to cause the spring loaded valve to open and close via the rotation of a camshaft.

An exhaust outlet control valve 414 releases the exhaust gas from the cylinder volume 402. A cam 416 of a second camshaft is adapted to cause the spring loaded exhaust valve 416 to open and close via the rotation of a camshaft.

The cylinder head 407 comprises various compartments and through-holes for the mounting of e.g. valves 408 and 414 and for e.g. guiding air into the cylinder volume 402 and exhaust gas out from the cylinder volume 402, or for the arrangement of cooling systems. Thus various parts of the cylinder head 407 are susceptible to clogging and may be in need of cleaning, whereby an excitation device 302 may be mounted on the cylinder head 407.

Some of the exhaust gas is circulated back via an exhaust gas recirculation cooler 418 and an exhaust gas recirculation valve 420 to be mixed with air from the air cooler 404 before entering the cylinder volume 402 via the air intake control valve 408. The efficiency of the exhaust gas recirculation cooler 418 and the exhaust gas recirculation valve 420 may be severely affected if subjected to clogging and may therefore also be in need of cleaning by means of an excitation device 302.

The air intake and exhaust outlet system may comprise further components such as backpressure valves and pressure regulators on the exhaust side of the cylinder. Such components are known per se to the skilled person and may be in need of cleaning periodically.

Accordingly, a cleaning system in accordance with the inventive concept may be arranged for cleaning of vehicle component in the gas or fluid flow of the arrangement shown in FIG. 4. Such vehicle components include e.g. temperature sensors 406, pressure sensors, exhaust gas recirculation coolers 418, exhaust gas recirculation valves 420, intake valves 405, intake air coolers 404, cylinder head 407 surfaces, etc. Additional vehicle component which are suitable for cleaning by a cleaning system in accordance with the invention may be cameras and other sensors arranged external on the vehicle and that may be exposed to contaminants from the outside environment.

An excitation device 302 may therefore be attached to the corresponding vehicle component as schematically illustrated in FIG. 4 which illustrates some example applications for the inventive concept.

As is further conceptually illustrated in FIG. 4, the excitation device may be arranged outside the gas or fluid flow and thus transfer the vibrational excitations through the body of the corresponding vehicle component to their surfaces in need of cleaning inside the gas or fluid flow.

The excitation device is controlled by a control unit as is described with reference to FIG. 5.

Figure 5:
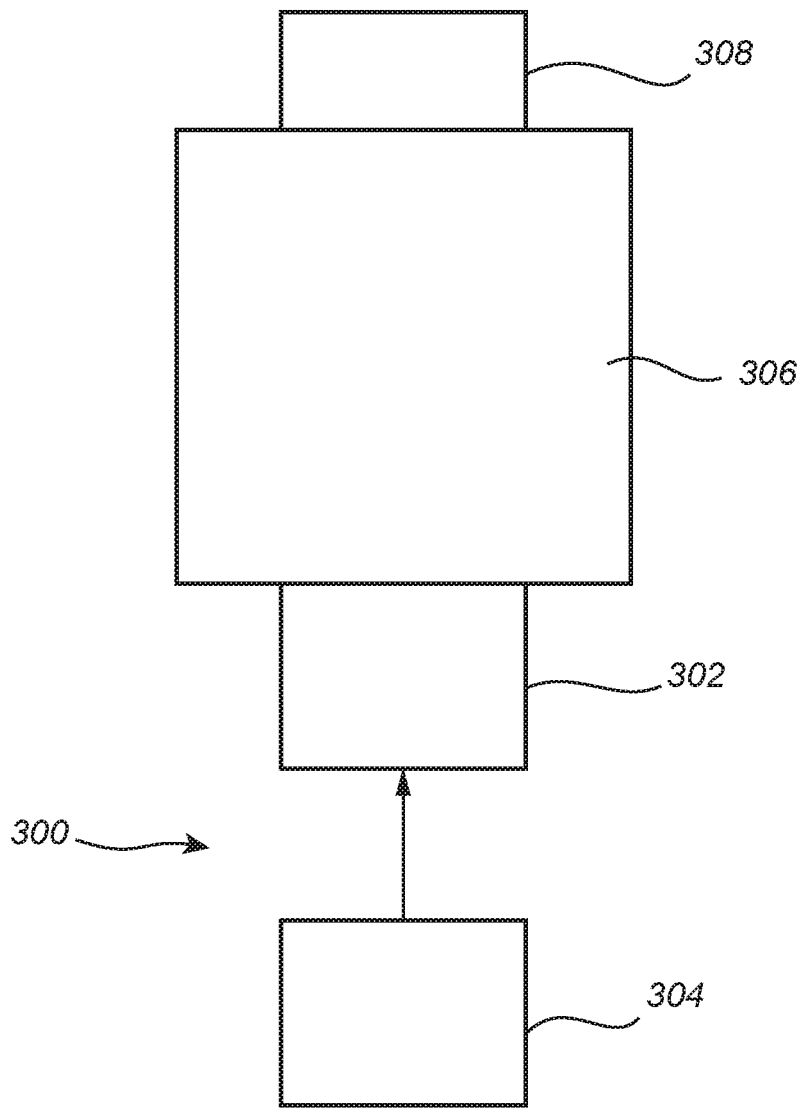
FIG. 5 is a box diagram of a cleaning system according to example embodiments.

FIG. 5 illustrates a schematic box diagram of a cleaning system 300 according to embodiments of the invention. The cleaning system 300 comprises an excitation device 302, which is adapted to be attached to a vehicle component 306. The vehicle component 306 is arranged nearby a surface 308 exposed to contaminants, or the vehicle component 306 comprises the surface 308 exposed to contaminants.

The excitation device 302 is configured to cause the surface 308 to mechanically vibrate by transferring a vibrational excitation to the surface 308. A control unit 304 is connected to the excitation device 302 to control the excitation device 302 to provide the vibrational excitation, and to control the frequency of the vibrational excitation. The frequency of the vibrational excitation is based on the configuration of the vehicle component 306.

The control unit 304 may be a dedicated control unit for the cleaning system, or it may be a shared control unit with other electrical/electronical systems of the vehicle.

Figure 6A:
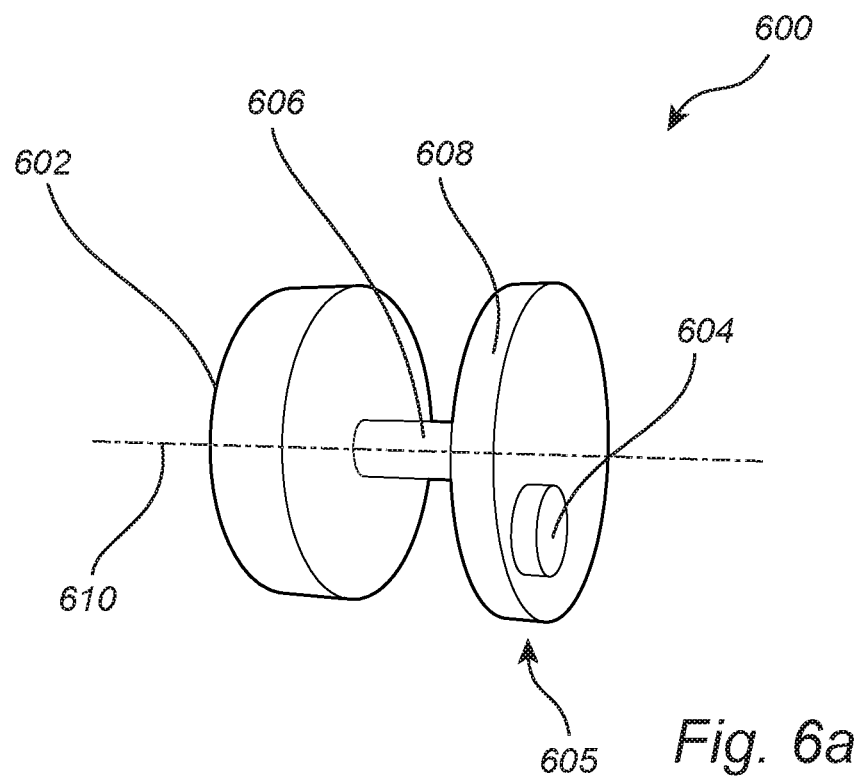
FIG. 6a-b conceptually illustrates an example excitation device.
Figure 6B:
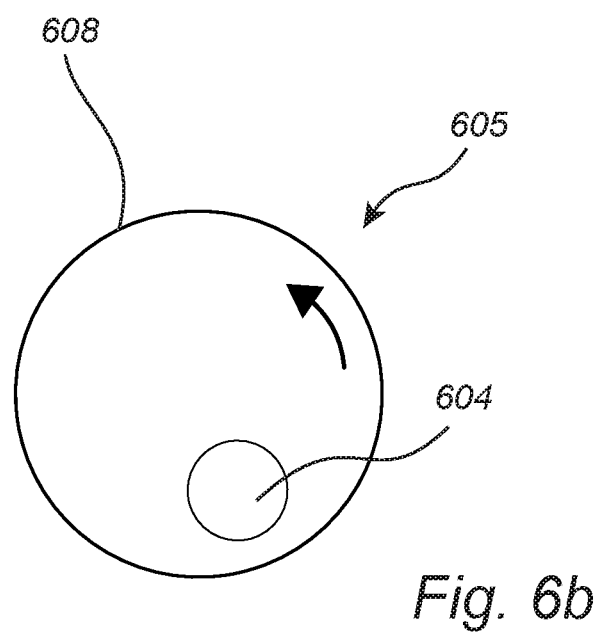

FIG. 6a is a perspective view of a conceptual example excitation device in the form of a rotating unbalance device 600. FIG. 6b is a front view of the rotating unbalance device 600.

The rotating unbalance device 600 comprises an electric motor 602 which may be able to provide relatively high rotational speeds such as e.g. 50 rpm to 20000 rpm. The rotating unbalance device 600 comprises a rotation member 605 in the form of a disk 608 comprising a mass element 604. The disk 608 is connected to the electric motor 602 via a shaft 606. The electric motor 602 is configured to cause the shaft 606 to rotate about its longitudinal axis 610 such that the disk 608 rotates about its center as shown in FIG. 6b. The axis of rotation 610 is off-center from the center of mass of the rotation member 605 comprising the disk 608 and the mass element 604.

Thus, as the rotation member 605 rotates as illustrated in FIG. 6b, the motion of the inertial mass 604 will shift the center of mass of the rotation member 605, which will cause a vibration of the rotation member 605 at the frequency of the rotation speed of the electric motor 602. This vibration may be transferred to a vehicle component as a vibrational excitation.

Other possible excitation devices may comprise ultrasound generators for providing a vibrational excitation in the form of an emitted ultra-sound signal, or piezoelectric excitation devices. A piezoelectric excitation device may comprise a piezoelectric component and a power source is configured to provide an excitation voltage signal to the piezoelectric component to cause the piezoelectric component to vibrate. The vibrations may be in the frequency range suitable for removing contaminants from contaminated surfaces of vehicle components.

Figure 7:
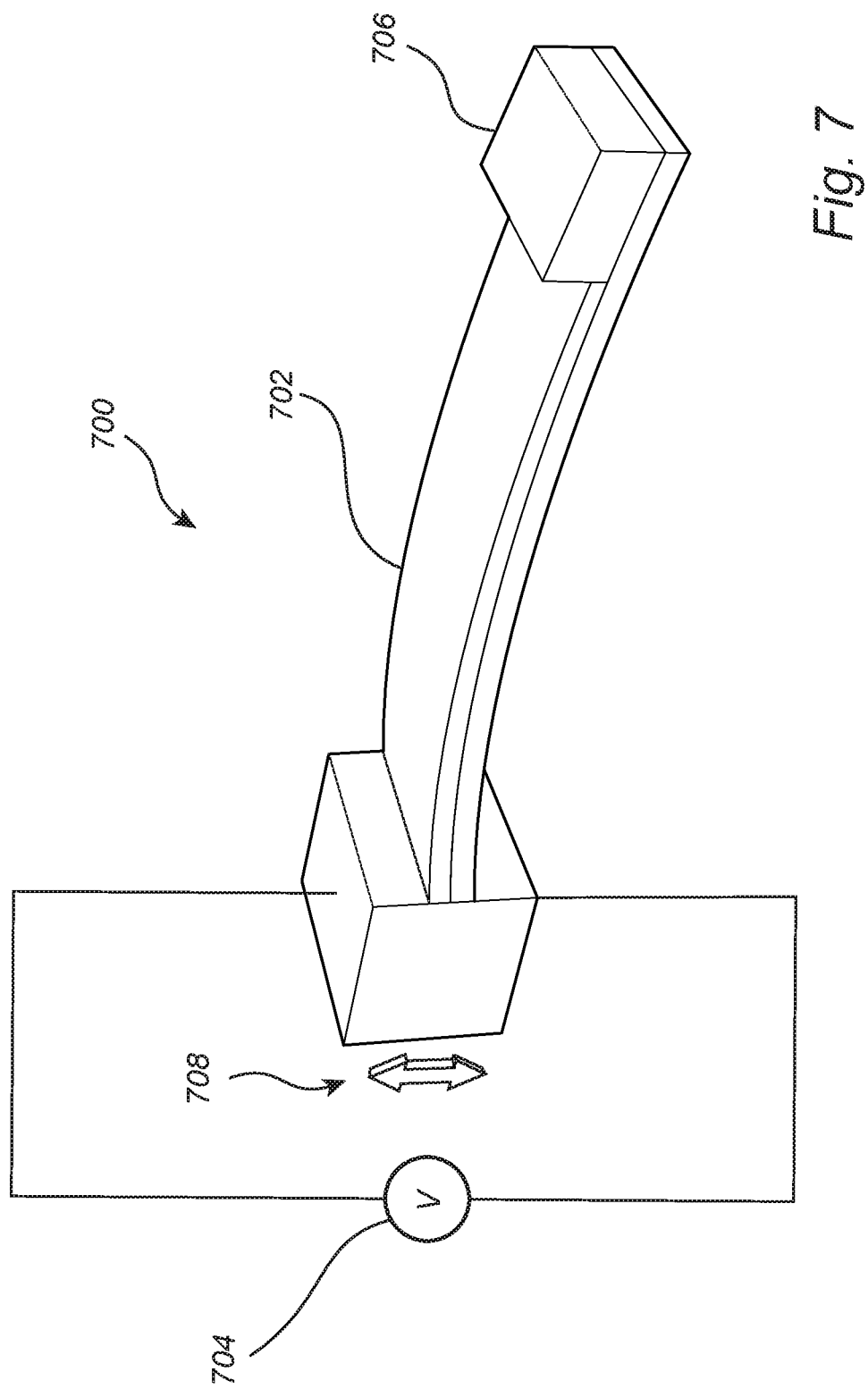
FIG. 7 conceptually illustrates an example excitation device.

FIG. 7 conceptually illustrates an excitation device 700 comprising a piezoelectric component 702 and a voltage source 704 configured to provide an excitation voltage signal, conceptually shown as 708 to the piezoelectric component 702. The voltage source 704 is controlled by a control unit (not shown) to control the frequency of the vibrational excitation. Furthermore, the piezoelectric component 702 comprises an additional mass element 706 to provide additional inertia in order to magnify the amplitude of the vibrational excitation. In FIG. 7 the piezoelectric component 702 is illustrated in a bent position (i.e. as part of a vibration) caused by an applied voltage.

Another possible excitation device may comprise oscillating solenoids comprising an electromagnet, which is arranged to attract a conducting metal element, loaded with a spring system. As the metal element is attracted by the electromagnet, it causes the DC electric circuit powering the electromagnet to short circuit, and the spring mechanism repositions the conducting metal element to its initial position (i.e., unloaded state). The repeated motion of the conducting metal element causes a vibration which may depend on element mass and applied voltage. Alternatively, an AC circuit would attract and repel metallic element accordingly.

Figure 8:
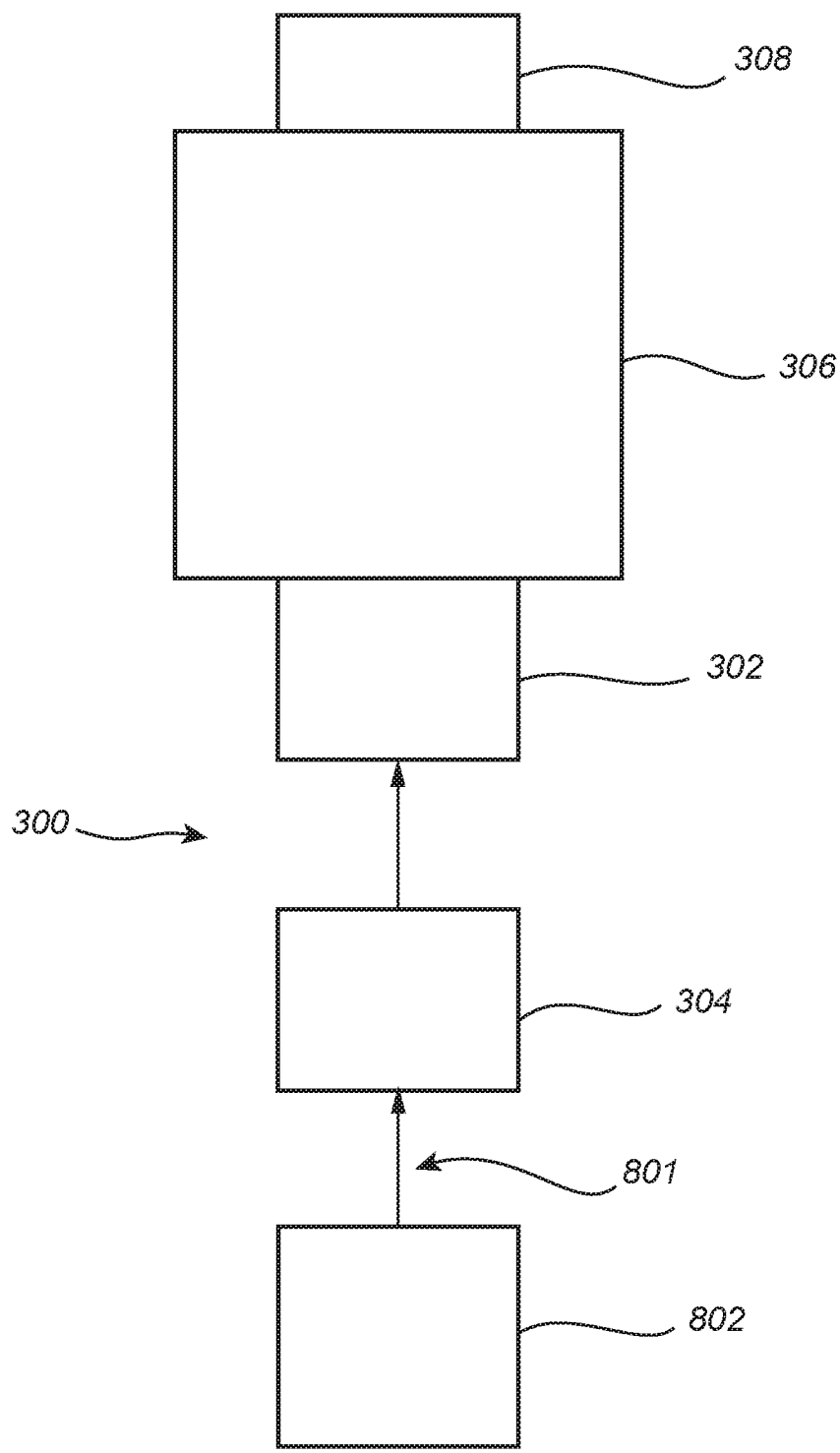
FIG. 8 is a box diagram of a cleaning system according to example embodiments.

FIG. 8 is a box diagram of a further embodiment of the invention. This example cleaning system 300 comprises the excitation device 302 and the control unit 304 as described with reference to FIG. 5. Here, the control unit is configured to receive an event signal 801 indicative of internal or external vehicle events. The event signal is received from a vehicle subsystem 802 responsible for various functions or operations of the vehicle. In response to the event signal, the control unit is configured to trigger the excitation device 302 to provide the vibrational excitation.

The event signal 801 is generated in response to a detected internal or external vehicle event. Accordingly, the excitation may be triggered by certain events, so that the vehicle driver/passengers will never notice inharmonious behavior. Further such events include, whenever door closing, wide open throttle, crank-up, etc.

Figure 9:
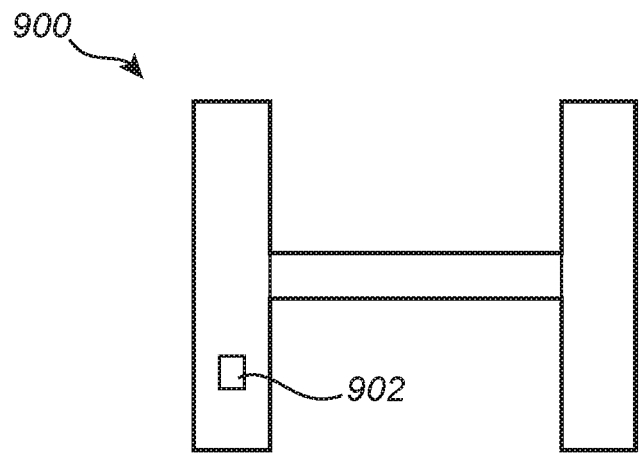
FIG. 9 schematically illustrates a sub-frame having thereon an active damper.

In some embodiments, the excitation device is comprised of an active damper for mechanically damping power train vibrations of a vehicle. FIG. 9 illustrates a schematic sub-frame 900 having thereon an active damper 902. The damper 902 is primarily configured to mechanically damp mechanical vibrations from the power train (not shown) of the vehicle. The active damper 902 may be controlled to vibrate at a frequency suitable for providing a vibrational excitation to a vehicle component (not shown) in need of cleaning. In other words, the active damper 902 may provide a vibrational excitation which is transferred via the sub-frame 900 to the vehicle component connected to the sub-frame 900.

Figure 10:
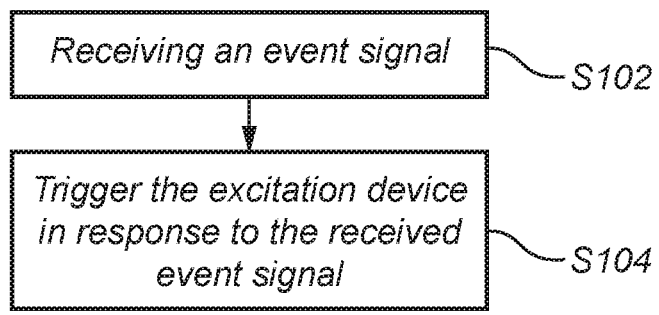
FIG. 10 is a flow-chart of method steps according to embodiments of the invention.

FIG. 10 is a flow-chart of method step according to embodiments of the invention. In step S102 is an event signal indicative of internal or external vehicle events received. An event signal may be received from other vehicle sub systems to determine a present vehicle state. The event signal was in more detail described above. The excitation device is triggered to provide the vibrational excitation at a frequency based on the configuration of the vehicle component in response to receiving the event signal in step S104.

Figure 11:
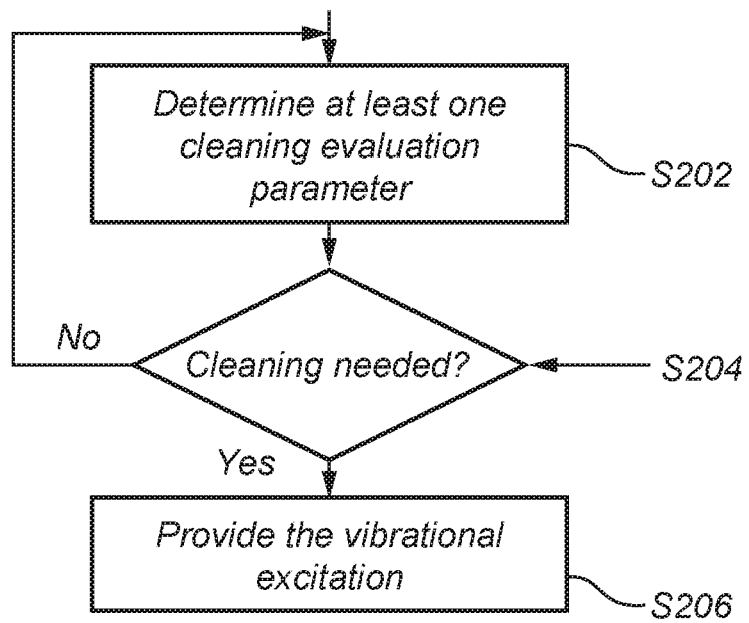
FIG. 11 is a flow-chart of method steps according to embodiments of the invention.

FIG. 11 is a flow-chart of method step according to further embodiments of the invention. In step S202 at least one cleaning evaluation parameter is determined. A control unit communicatively connected to the excitation device may constantly be listening for receiving a signal comprising the cleaning evaluation parameter. Based on the cleaning evaluation parameter, it is determined by the excitation device control unit whether or not cleaning of the vehicle component is required in step S204. Subsequently, in step S206, when it is determined that the vehicle component is in need of cleaning, the excitation device is caused to provide a vibrational excitation at a frequency selected based on the configuration of the vehicle component. In case it is determined by the excitation device control logic that the vehicle component is not in need of cleaning, the control algorithm returns back to state of listening for the signal comprising a cleaning evaluation parameter in order to return to step S202.

Determining whether or not cleaning of the vehicle component is required in step S204 may be based on a mathematical process to compare a pre-determined, pre-registered and/or computed cleaning evaluation parameter to the actual cleaning evaluation parameter. It is determined by the excitation device control unit whether or not cleaning of the vehicle component is required in step S204.

Alternatively, the cleaning evaluation parameter may relate to a pre-determined counter/timer event. Based on a mathematical process to compare a pre-set maximum elapsed time value to the actual cleaning evaluation parameter in the form of an presently elapsed time, it is determined by the excitation device control unit whether or not cleaning of the vehicle component is required in step S204. In other words, when the timer event or counter registers a value that exceeds a pre-set threshold counter or timer value, a cleaning action is due.

When it is determined that cleaning is due, the control unit may be configured to postpone the cleaning event, and i.e. the excitation device postpones providing the vibrational excitation, until an event signal is received. As mentioned above, such event signal may be indicative of various instances such as: whenever door closing, wide open throttle, crank-up, etc. happens.

The control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A cleaning system for removal of contaminants from a surface of a lambda probe, temperature probe, or heat exchanger exposed to a gas or fluid flow, the cleaning system comprising:
an excitation device adapted to be attached to the vehicle component in the vicinity of the surface exposed to contaminants, wherein the excitation device is configured to cause the surface to mechanically vibrate by transferring a vibrational excitation to the surface, wherein the excitation device is arrangeable isolated from the gas or fluid flow;
wherein the frequency of the vibrational excitation is controllable to be based on the configuration of the vehicle component, wherein the frequency of the vibrational excitation is swept through a frequency range comprising a natural frequency of the lambda probe, temperature probe, or heat exchanger.

2. The cleaning system according to claim 1, comprising a control unit configured to control the frequency of the vibrational excitation.

3. The cleaning system according to claim 2, wherein the control unit is configured to sweep the frequency of the vibrational excitation through the frequency range comprising the natural frequency of the lambda probe, temperature probe, or heat exchanger.

4. The cleaning system according to claim 1, wherein the excitation device comprises a rotating unbalance device.

5. The cleaning system according to claim 4, wherein the rotating unbalance device comprises an electric motor, wherein the electric motor is configured to cause a rotation member to rotate about an axis of rotation, wherein the axis of rotation is off-center from the center of mass of the rotation member.

6. The cleaning system according to claim 1, wherein the excitation device comprises an ultra-sound generator.

7. The cleaning system according to claim 1, wherein the excitation device comprises a piezoelectric component or a vibrational solenoid, and a power source configured to provide an excitation voltage signal to the piezoelectric component or the vibrational solenoid to cause the piezoelectric component or the vibrational solenoid to vibrate.

8. The cleaning system according to claim 1, wherein the excitation device comprises a linear resonant actuator.

9. The cleaning system according to claim 1, wherein the excitation device is an add-on device adapted to be retrofitted on pre-mounted vehicle components.

10. The cleaning system according to claim 1, wherein the excitation device is comprised of an active damper for mechanically damping a power train of the vehicle.

11. The cleaning system according to claim 2, wherein the control unit is configured to:
receive an event signal indicative of internal or external vehicle events, and
trigger the excitation device to provide the vibrational excitation in response to receiving the event signal.

12. The cleaning system according to claim 2, wherein the control unit is configured to detect that the vehicle component is contaminated, wherein the control unit is configured to cause the excitation device to provide the vibrational excitation until a pre-determined cleansing level is reached.

\* \* \* \* \*